(12) United States Patent
Demtroeder

(10) Patent No.: US 8,393,993 B2
(45) Date of Patent: Mar. 12, 2013

(54) WIND TURBINE COMPRISING AT LEAST ONE GEARBOX AND AN EPICYCLIC GEARBOX

(75) Inventor: Jens Demtroeder, Ronde (DK)

(73) Assignee: Vestas Wing Systems A/S, Aarhus N. (DK)

( * ) Notice: Subject to any disclaimer, the term of this patent is extended or adjusted under 35 U.S.C. 154(b) by 220 days.

(21) Appl. No.: 12/179,061

(22) Filed: Jul. 24, 2008

(65) Prior Publication Data

US 2008/0279686 A1    Nov. 13, 2008

Related U.S. Application Data

(63) Continuation of application No. PCT/DK2007/000035, filed on Jan. 25, 2007.

(51) Int. Cl.
*G01F 17/00* (2006.01)
*G01F 23/00* (2006.01)
*G01H 1/08* (2006.01)
*F16H 57/08* (2006.01)

(52) U.S. Cl. .............................. 475/331; 73/593; 702/56

(58) Field of Classification Search .................. 475/331; 73/593; 702/56
See application file for complete search history.

(56) References Cited

U.S. PATENT DOCUMENTS

| | | | |
|---|---|---|---|
| 4,239,977 A | 12/1980 | Strutman | |
| 4,291,233 A | 9/1981 | Kirschbaum | |
| 5,663,600 A | 9/1997 | Baek et al. | |
| 5,967,940 A * | 10/1999 | Yamaguchi | 477/107 |
| 6,024,324 A * | 2/2000 | Maino et al. | 244/17.13 |
| 6,232,673 B1 | 5/2001 | Schoo et al. | |
| 6,304,002 B1 | 10/2001 | Dehlsen et al. | |
| 6,790,156 B2 * | 9/2004 | Hosle | 475/331 |
| 6,898,975 B2 * | 5/2005 | Blunt | 73/593 |
| 7,154,191 B2 | 12/2006 | Jansen et al. | |
| 2002/0049108 A1 | 4/2002 | Hosle | |
| 2003/0015052 A1 | 1/2003 | Hulshof | |
| 2003/0089177 A1 | 5/2003 | Luthje et al. | |
| 2003/0222456 A1 | 12/2003 | Mikhall et al. | |
| 2004/0237683 A1 | 12/2004 | Mikhail et al. | |
| 2005/0012339 A1 | 1/2005 | Mikhail et al. | |
| 2005/0282678 A1 | 12/2005 | Mundis | |
| 2006/0104815 A1 | 5/2006 | Siegfriedsen | |
| 2006/0205557 A1 | 9/2006 | Arndt et al. | |

(Continued)

FOREIGN PATENT DOCUMENTS

AU    672166    9/1996
DE    19954164 A1    11/1999

(Continued)

OTHER PUBLICATIONS

Translation of JP 57-18838A done Nov. 29, 2010.*

(Continued)

*Primary Examiner* — Tisha Lewis
(74) *Attorney, Agent, or Firm* — Wood, Herron & Evans, LLP

(57) ABSTRACT

The invention relates to a wind turbine comprising at least one gearbox. The gearbox comprises one or more sensors for measuring condition values of the wind turbine, and is characterized in that the one or more sensors are mounted on one or more rotating parts of the gearbox. The invention further relates to an epicyclic gearbox comprising a gearbox housing, one or more gearbox parts rotating in relation to the housing, and one or more sensors for measuring condition values of the gearbox. The epicyclic gearbox is characterized in that, the one or more sensors are mounted on one or more of the rotating parts of the gearbox.

47 Claims, 6 Drawing Sheets

U.S. PATENT DOCUMENTS

| | | | |
|---|---|---|---|
| 2006/0265175 A1* | 11/2006 | Shimohamadi | 702/130 |
| 2007/0108776 A1 | 5/2007 | Siegfriedsen | |
| 2007/0129207 A1* | 6/2007 | Kanamori | 475/331 |
| 2008/0127755 A1* | 6/2008 | Kim | 73/865.9 |
| 2008/0279696 A1 | 11/2008 | Liang | |
| 2008/0315697 A1 | 12/2008 | Bonnet | |
| 2009/0058094 A1 | 3/2009 | Jansen et al. | |
| 2009/0163316 A1 | 6/2009 | Saenz De Ugarte et al. | |
| 2009/0233721 A1 | 9/2009 | Saenz De Ugarte et al. | |
| 2009/0289460 A1 | 11/2009 | Bech | |
| 2009/0309369 A1 | 12/2009 | Llorente Gonzalez | |
| 2010/0082276 A1* | 4/2010 | Becker | 702/56 |
| 2010/0105512 A1 | 4/2010 | Berger et al. | |
| 2010/0198534 A1* | 8/2010 | Hala et al. | 702/56 |
| 2011/0230304 A1* | 9/2011 | Morel | 475/331 |

FOREIGN PATENT DOCUMENTS

| | | |
|---|---|---|
| DE | 10318945 B3 | 10/2004 |
| DE | 102010009634 A1 * | 9/2011 |
| EP | 0811764 A1 | 12/1997 |
| EP | 1184567 A2 | 8/2001 |
| EP | 1243791 A2 | 9/2002 |
| EP | 1318329 A2 | 6/2003 |
| EP | 1612458 A2 | 1/2006 |
| EP | 2072858 A1 | 6/2009 |
| GB | 2260815 A * | 4/1993 |
| GB | 2382117 A | 5/2003 |
| JP | 56168520 A * | 12/1981 |
| JP | 57018838 A * | 1/1982 |
| JP | 05119047 A * | 5/1993 |
| JP | 11037893 A * | 2/1999 |
| JP | 2002303254 A | 10/2002 |
| WO | 9611338 A1 | 4/1996 |
| WO | 2004040740 A1 | 5/2004 |
| WO | 2005075822 A1 | 8/2005 |
| WO | 2008113318 A2 | 9/2008 |
| WO | 2009049599 A2 | 4/2009 |

OTHER PUBLICATIONS

International Search Report, May 3, 2007, 3 pages.
International Preliminary Report on Patentability, Jan. 25, 2007, 14 pages.

* cited by examiner

WIND TURBINE COMPRISING AT LEAST ONE GEARBOX AND AN EPICYCLIC GEARBOX

CROSS-REFERENCE TO RELATED APPLICATIONS

The present application is a continuation of pending International patent application PCT/DK2007/000035, filed Jan. 25, 2007, which designates the United States, and claims priority from Denmark patent application no. PA 2006 00114, filed Jan. 25, 2006, the content of which is incorporated herein by reference.

FIELD OF THE INVENTION

The invention relates to a wind turbine comprising an epicyclic gearbox, having one or more sensors means for measuring vibrations and/or acoustic emission of the wind turbine, and an epicyclic gearbox comprising a gearbox housing, one or more gearbox parts rotating in relation to the housing, and one or more sensors comprising means for measuring vibrations and/or acoustic emission of the gearbox.

BACKGROUND OF THE INVENTION

Monitoring the condition of gearboxes, motors, transmissions and other electrical and/or mechanical components comprising parts which rotates during use are well known. Particularly wind turbine gearboxes used in remote installations, such as in an off-shore wind turbine operating without permanent supervision, vibration monitoring techniques have proven very efficient for detecting problems at an early stage, hereby making it possible to initiate preventive maintenance or repair before any major damage occurs.

Epicyclic gears are properly the most compact embodiment of a gearbox, and in applications, such as wind turbines, where minimum size and weight are important, the use of epicyclic gearboxes is very widespread. But epicyclic gears have the major downside that smithereens from small initial damage may be torn through the gear contacts and bearings and thereby cause severe secondary damage.

In worst case, smithereens may cause the entire gearbox to seize, causing heavy damage not only to the gearbox itself but also to the equipment providing the input and the equipment receiving the output from the gearbox.

It is therefore known to provide the gearbox housing with one or more accelerometers or microphones for monitoring the condition of the gears and bearings. The output from these sensors is then filtered, using more or less complex methods, in order to be able to identify damage or potentially destructive conditions.

But in gearboxes such as epicyclic gearboxes, where rotating parts rotate on other rotating parts, the relatively small vibrations amplitudes of initial damage can easily be modulated e.g. by heavy gear impacts, hereby making it very difficult to pick up or identify the significant frequencies.

An object of the invention is therefore to provide for a technique for improving the detection of both initial and secondary damage in wind turbine gearboxes.

Furthermore, it is an object of the invention to provide for a technique for improving the detection of both initial and secondary damage in epicyclic gearboxes.

SUMMARY OF THE INVENTION

The invention provides for a wind turbine comprising at least one gearbox. The gearbox comprises one or more sensors for measuring condition values of the wind turbine, and is characterized in that the one or more sensors are mounted on one or more rotating parts of the gearbox.

Placing the sensors on the rotating parts of the gearbox is advantageous, in that the sensors then are positioned closer to or on the gearbox parts, such as gears, shafts, bearings—either the inner or the outer bearing ring—gear carrier etc., which provides the condition values, that can be used to predict or detect a defect in the gearbox or other rotating or moving wind turbine parts.

Furthermore, positioning the sensors on the rotating parts of the gearbox creates a more direct transmission path for structure-born noise or vibrations generated by a possible defect, hereby enabling that small initial damage is detected before it causes any major damage. Additionally, the earlier a possible defect is detected the higher the chances are that there is time to initiate preventive maintenance, without having to shut down the entire wind turbine.

In an aspect of the invention, said at least one gearbox is an epicyclic gearbox comprising at least two planet gears each including a planet gear shaft, said epicyclic gearbox further comprising at least one planet carrier connecting said planet gears.

Epicyclic gearboxes comprises several rotating parts mounted on other rotating parts, hereby making it difficult to identify or pick up vibrations originating for possible defects—especially defects originating from the double rotating parts. It is therefore particularly advantageous to place the sensors on the rotating parts in an epicyclic gearbox.

In an aspect of the invention, said one or more sensors are mounted on or in close proximity of one or more of said at least two planet gear shafts.

It is advantageous to place the sensors on or in close proximity of the planet gear shafts, in that the shafts in most epicyclic gearboxes are easily accessible and in that at least parts of the planet gear shafts are not exposed to gear oil.

Furthermore, the planet gears mounted on the shafts at some point gets in contact with most of the other gears in the epicyclic gearbox, hereby ensuring that a defect is detected early.

In an aspect of the invention, said one or more sensors are mounted on said at least one planet carrier.

The planet carrier is in most epicyclic gearboxes easily accessible and is not directly exposed to the gear oil, which is advantageous in that, the risk of the gear oil interfering with the sensors measurements or damaging the sensors is hereby reduced.

Furthermore, through the planet gear shafts, the planet carrier is connected to all the planet gears, which is advantageous, in that a good transmission path for structure-born vibrations from all the critical parts of the gearbox is hereby provided.

In an aspect of the invention, each of said at least one planet carrier comprise only one sensor.

Providing the planet carrier with only one sensor is advantageous, in that it provides for a cost efficient way of detecting defects.

In an aspect of the invention, said one or more sensors comprise means for measuring vibrations and/or acoustic emission.

Monitoring the vibrations and/or the acoustic emission from e.g. a gearbox, is a well-proven and efficient way of detecting defects at an early stage. It is therefore advantageous to provide the sensors with means for measuring vibrations and/or acoustic emission.

In an aspect of the invention, said one or more sensors are one or more accelerometers and/or one or more microphones.

Using accelerometers and/or microphones, is a well-proven and efficient way of detecting defects on moving or rotating parts at an early stage. It is therefore advantageous if the sensors are accelerometers and/or microphones.

It should be emphasized that the term "accelerometer" refers to a sensor that measures acceleration or more specifically a device used to measure the rate of change in velocity over a specific period of time. An accelerometer can measure the acceleration in one direction, it can measure the acceleration in several directions such as two or three directions e.g. perpendicular to each other or it can comprise several accelerometers built together to form a single accelerometer capable of measuring acceleration in several directions.

In an aspect of the invention, said one or more sensors are connected to one or more data transmitters for transmitting data to an external data receiver.

Connecting the sensors to data transmitters for transmitting the condition values—picked up by the sensors—to an external data receiver, is advantageous in that, it hereby is possible to reduce the amount of electrical equipment placed inside the gearbox, hereby enabling that e.g. the data can be analyzed outside the gearbox by equipment placed in a more friendly and controlled environment.

In an aspect of the invention, said connection is made wirelessly.

Connecting the sensors to the data transmitter wirelessly is advantageous in that it among other things provides for a more simple and inexpensive installation procedure.

In an aspect of the invention, said one or more data transmitters are mounted on said one or more rotating parts of said gearbox.

Placing the data transmitters on a rotating part in gearbox is advantageous, in that the data transmitters then is positioned in close proximity of the sensors.

In an aspect of the invention, more than one of said one or more sensors are connected to the same data transmitter.

Connecting more sensors to the same data transmitter provides for a simple and cost-efficient way of transmitting the sensors measurements.

In an aspect of the invention, said one or more data transmitters comprise means for transmitting data continuously during operation of said gearbox.

Transmitting data continuously is advantageous, in that it hereby is possible to monitor the gearbox and other wind turbine components continuously, hereby enabling that a possible defect is detected more or less as soon as possible.

In an aspect of the invention, said one or more data transmitters comprise means for transmitting data upon receiving a request from an externally positioned request emitter.

Making the data transmitter transmit data only when receiving a request from an externally positioned request emitter is advantageous, in that by this is possible to reduce the data transmission and by this reducing the power consumption of the sensors and transmitters inside the gearbox. The request emitter could e.g. be a surveillance unit monitoring the condition of several or all components of the wind turbine. When the unit by other means detects that there could be a problem in the gearbox or in other connected wind turbine components, it could emit a signal to the data transmitter, requesting data from the sensors to confirm or support the suspicion of a problem.

In an aspect of the invention, said one or more data transmitters are hard wired to said external data receiver e.g. through a slip ring or brush connection.

Hard wiring provides for a safe and reliable connection technique which is advantageous in connection with establishing electrical communication between the data transmitter and the external data receiver.

Furthermore, it should be emphasised that "slip ring or brush connection" is only two of a number of different ways of transmitting electrical signals from a rotation shaft to a stationary part without doing it wirelessly.

In an aspect of the invention, said one or more data transmitters comprise means for transmitting said sensors measurements wirelessly.

Connecting fixed parts with rotating parts by means of wires or cables can be very complex and especially if the rotating part is mounted on another rotating part. It is therefore advantageous to provide the data transmitters with means for transmitting data wirelessly.

In an aspect of the invention, said one or more data transmitters comprise a transponder.

Using a transponder is advantageous, in that the data transmitters and sensors do not need a permanent power supply. Wirelessly the transponder is fed an electromagnetic impulse from the outside of the gearbox, making it generate power enough for the sensors to measure the condition values and transmit them back to an external data receiver.

In an aspect of the invention, said one or more data transmitters and said one or more sensors are formed integrally as one unit.

Forming the sensors and data transmitters as one unit is advantageous, in that the total production and mounting costs hereby can be reduced.

In an aspect of the invention, said one or more sensors are connected to one or more data processing units.

Connecting sensors to a data processing unit is advantageous, in that it hereby is possible to filter, compress, analyse or in other way process the data from sensors and thereby enable a faster detection of defects or damage to the gearbox or other wind turbine equipment.

In an aspect of the invention, said one or more data processing units are mounted on said one or more rotating parts of said gearbox.

Placing the data processing unit on the rotating parts in the gearbox is advantageous, in that it hereby is easy to connect the sensors and/or data transmitters to the data processing unit, without having to provide cables over rotating joints.

Furthermore it would be quit difficult to transmit all the raw data from the sensors to an externally placed data processing unit. First of all because the shear amount of data would require a large bandwidth and require relatively much power to be transmitted, secondly because of the risk of loss or signal noise could reduce the data quality. If the data are process in the gearbox e.g. only an on-off alarm signal would need to be transmitted in case of a problem being detected.

In an aspect of the invention, more than one of said one or more sensors are connected to the same data processing unit.

Connecting several sensors to the same data processing unit is advantageous, in that the cost of the equipment and the mounting costs hereby are reduced.

In an aspect of the invention, said one or more data processing units comprise means for detecting defects in said gearbox based on the measurements of said one or more sensors.

Making the data processing units comprise means for detecting defects in the gearbox is advantageous, in that it hereby is possible to avoid continuous data transmission to the outside. The relatively large amount of raw data from the sensors could be processed and analyzed inside the gearbox, where after the data processing unit would only have to emit (or remove) a simple signal in the case, that a defect was detected.

In an aspect of the invention, said one or more data processing units comprise means for generating an alarm signal when detecting a defect in said gearbox.

Making the data processing unit generate an alarm signal when detecting a defect is advantageous, in that this signal could be much simpler than e.g. a constant sensor signal, hereby reducing the risk of data being lost and thereby increasing the reliability of the system.

In an aspect of the invention, said one or more data processing units comprise means for filtering said one or more sensors measurements.

The signals from the sensors could include a large amount of undesired information such as short-term fluctuations or static noise. It is therefore advantageous to filter the sensors measurements before they are analysed to simplify and speed up the analyse process and to reduce the amount of data, hereby making a possible data transmission more simple and reliable.

In an aspect of the invention, said one or more data processing units comprise means for compressing the data of said one or more sensors measurements.

It is advantageous to compress the data, in that because of the reduced amount of data, a possible data transmission can be made more simple and reliable.

In an aspect of the invention, said one or more data processing units and said one or more data transmitters are formed integrally as one unit.

Forming the data processing units and the data transmitters as one unit is advantageous, in that the total production and mounting costs hereby can be reduced.

In an aspect of the invention, said one or more data processing units and said one or more sensors are formed integrally as one unit.

Forming the data processing units and the sensors as one unit is advantageous, in that the total production and mounting costs hereby can be reduced.

In an aspect of the invention, said one or more sensors are mounted in one or more of said at least two planet gear shafts.

Mounting the sensors in the shafts e.g. inside holes, recesses or other types of cavities in the shafts provides for a more controlled and protected environment for the sensors hereby reducing the risk of damage or malfunction of the sensors.

The invention further relates to an epicyclic gearbox comprising a gearbox housing, one or more gearbox parts rotating in relation to the housing, and one or more sensors for measuring condition values of the gearbox. The epicyclic gearbox is characterized in that, the one or more sensors are mounted on one or more of the rotating parts of the gearbox.

Compared to other gearbox types, epicyclic gearboxes are characterised in that they comprise a large number of rotating parts and in that they comprise rotating parts mounted on other rotating parts. It is therefore particularly advantageous to mount the sensors measuring the gearboxes condition on the rotating parts of an epicyclic gearbox, in that a more direct path between the source and the sensor is hereby created.

There is a relatively large risk of defect vibrations, originating from a rotating or a "double" rotating gear, being lost if the sensors are placed on a fixed member an epicyclic gearbox. Placing the sensors on one or more rotating parts of an epicyclic therefore creates a more direct transmission path for structure-born vibrations originating from possible defects, hereby increasing the sensors functionality and reliability.

In an aspect of the invention, said one or more sensors are mounted on or in close proximity of one or more planet gear shafts of said epicyclic gearbox.

In an aspect of the invention, said one or more sensors are mounted on at least one planet carrier of said epicyclic gearbox.

In an aspect of the invention, each of said at least one planet carrier comprise only one sensor.

In an aspect of the invention, said one or more sensors comprise means for measuring vibrations and/or acoustic emission.

In an aspect of the invention, said one or more sensors are one or more accelerometers and/or one or more microphones.

In an aspect of the invention, said one or more sensors are connected to one or more data transmitters for transmitting data to an external data receiver.

In an aspect of the invention, said one or more data transmitters are mounted on said one or more rotating parts of said epicyclic gearbox.

In an aspect of the invention, more than one of said one or more sensors are connected to the same data transmitter.

In an aspect of the invention, said one or more data transmitters comprise means for transmitting data continuously during operation of said epicyclic gearbox.

In an aspect of the invention, said one or more data transmitters comprise means for transmitting data upon receiving a request from an externally positioned request emitter.

In an aspect of the invention, said one or more data transmitters comprise means for transmitting said sensors measurements wirelessly.

In an aspect of the invention, said one or more data transmitters comprise a transponder.

In an aspect of the invention, said one or more data transmitters and said one or more sensors are formed integrally as one unit.

In an aspect of the invention, said one or more sensors are connected to one or more data processing units.

In an aspect of the invention, said one or more data processing units are mounted on said one or more rotating parts of said gearbox.

In an aspect of the invention, more than one of said one or more sensors are connected to the same data processing unit.

In an aspect of the invention, said one or more data processing units comprise means for detecting defects in said epicyclic gearbox based on the measurements of said one or more sensors.

In an aspect of the invention, said one or more data processing units comprise means for generating an alarm signal when detecting a defect in said epicyclic gearbox.

In an aspect of the invention, said one or more data processing units comprise means for filtering said one or more sensors measurements.

In an aspect of the invention, said one or more data processing units comprise means for compressing the data of said one or more sensors measurements.

In an aspect of the invention, said one or more data processing units and said one or more data transmitters are formed integrally as one unit.

In an aspect of the invention, said one or more data processing units and said one or more sensors are formed integrally as one unit.

In an aspect of the invention, said one or more sensors are mounted in one or more planet gear shafts of said epicyclic gearbox.

BRIEF DESCRIPTION OF THE DRAWINGS

The invention will be described in the following with reference to the figures in which FIG. 1. illustrates a large modern wind turbine known in the art, as seen from the front.

DETAILED DESCRIPTION OF THE INVENTION

Figure 1:
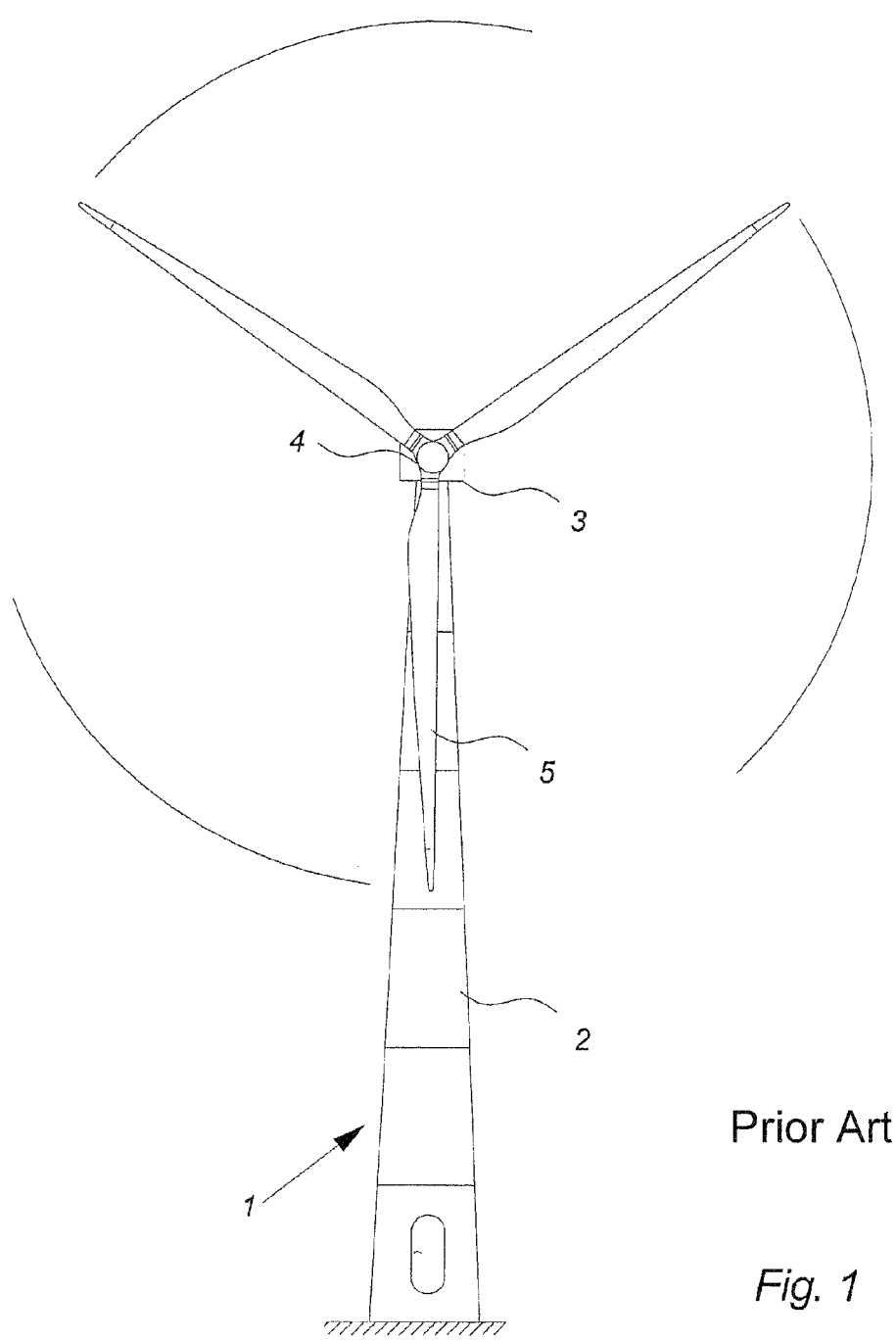

FIG. 1 illustrates a modern wind turbine 1, comprising a tower 2 and a wind turbine nacelle 3 positioned on top of the tower 2. The wind turbine rotor 4, comprising three wind turbine blades 5, is connected to the nacelle 3 through the low speed shaft 6 which extends out of the nacelle 3 front.

Figure 2:
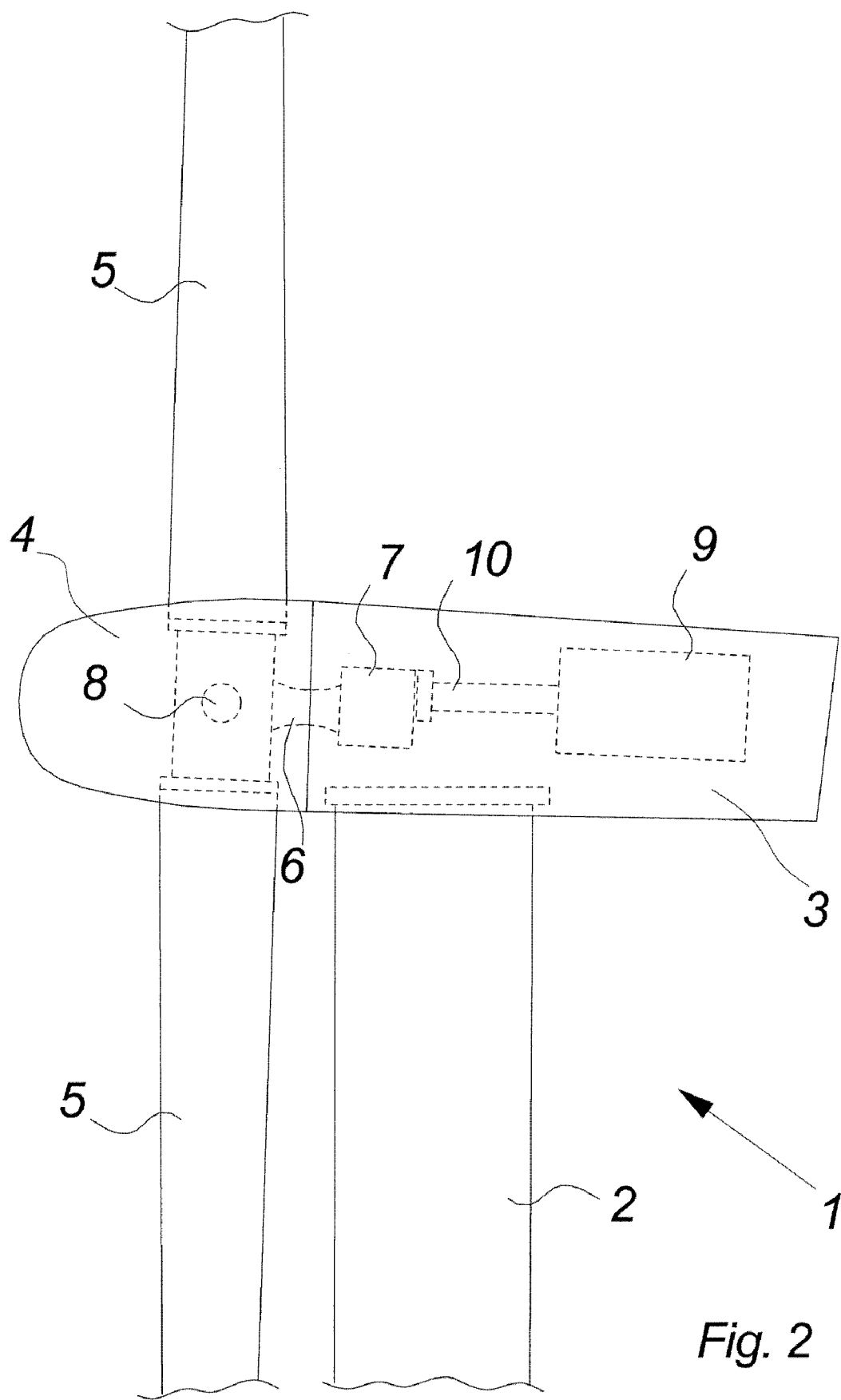
FIG. 2 illustrates an embodiment of a wind turbine nacelle, as seen from the side.

FIG. 2 illustrates an embodiment of a wind turbine nacelle 3, as seen from the side. The drive train in a traditional wind turbine 1 known in the art usually comprises a rotor 4 connected to a gearbox 7 by means of a low speed shaft 6. In this embodiment the rotor 4 comprise only two blades 5 connected to the low speed shaft 6 by means of a teeter mechanism 8, but in another embodiment the rotor 4 could comprise another number of blades 5, such as three blades 5, which is the most common number of blades 5 on modern wind turbines 1. In another embodiment the rotor 4 could also be connected directly to the gearbox 7.

The gearbox 7 is then connected to the generator 9 by means of a high speed shaft 10.

Because of the limited space in the nacelle 3 and to minimize the weight of the nacelle 3 the preferred gearbox 7 type in most modern wind turbines 1 is an epicyclic gearbox 11, but other gearbox 7 types are also feasible, such as one or more spur gearboxes, worm gearboxes, helical gearboxes or a combination of different transmission and gearbox 7 types.

Figure 3:
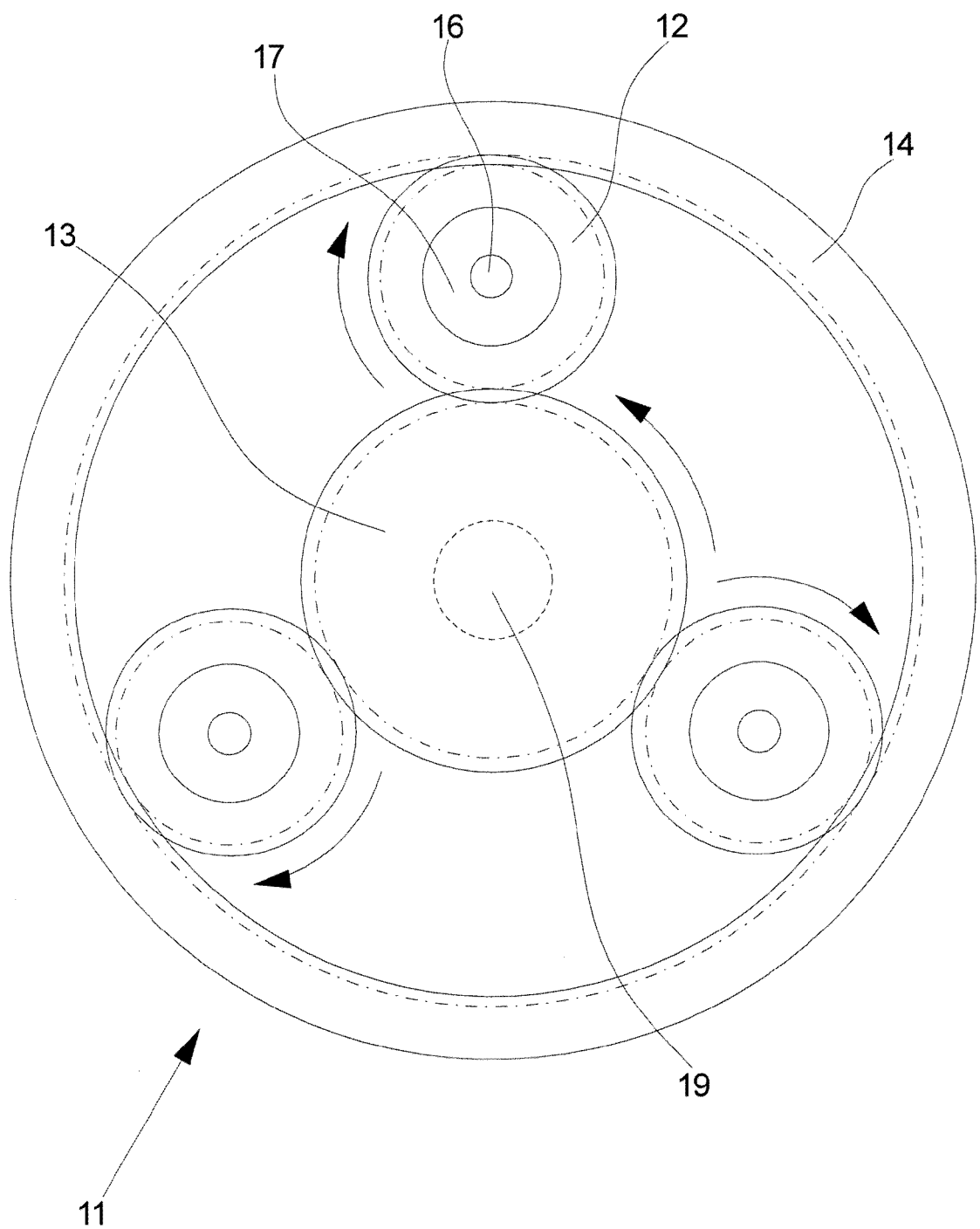
FIG. 3 illustrates an embodiment of a epicyclic gearbox, as seen from the front.

FIG. 3 illustrates an embodiment of an epicyclic gearbox 11 as seen from the front. The planet gears 12 mesh with and rotate around a sun gear 13 in the middle and they mesh with an outer annulus gear 14. The arrows indicate that the planet gears 12 all rotate in the same direction and that the sun gear 13 rotates in the opposite direction.

In this embodiment the epicyclic gearbox comprise three planet gears 12, but in another embodiment it could also comprise another number such as two, four or five planet gears 12.

Each planet gear 12 is provided with one or more planet gear bearings 17 and each of the planet gears 12 with bearings are mounted on a planet gear shaft 16.

Figure 4:
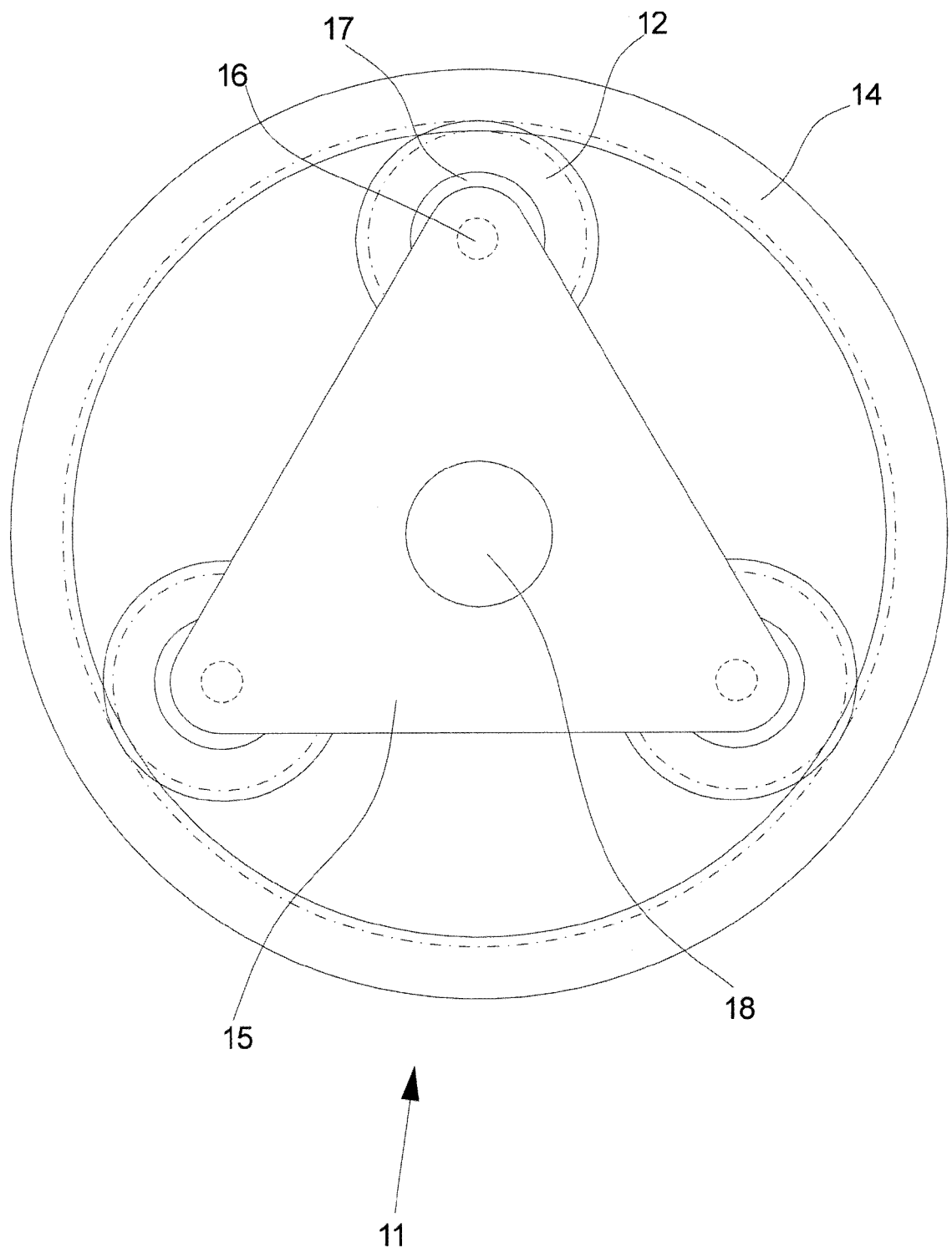
FIG. 4 illustrates an embodiment of an epicyclic gearbox comprising a planet carrier, as seen from the front.

FIG. 4 illustrates an embodiment of an epicyclic gearbox 11 comprising a planet carrier 15, as seen from the front. The planet carrier 15 connects the planet gears 12 by fixating the planet gear shafts 16, making it rotate as the planet gears 12 travel around the sun gear 13.

Typically the annulus gear 14 is connected to a carrying frame, to the gearbox housing or is in other ways fixed, but in some epicyclic gearbox 11 types the annulus gear 14 could also rotate. Furthermore, the illustrated gears show only one stage of a gearbox 11. The entire gearbox could comprise a number of stages as the one shown to increase the gearing, or it could comprise a number of different stages e.g. a first stage where the sun gear 13 is missing and the input shaft 18 rotates the annulus gear 14, which mesh with a number of planet gears 12. The planet gears 12 of the first stages is then connected to planet gears 12 of a larger size in a second stage, which mesh with a sun gear 13, which is connected to the output shaft 19 of the gearbox 11. Other gearbox 11 designs are also feasible often depending on what the gearbox 11 is to be used for. In wind turbines 1 the gearbox 11 could be designed to carry the entire load of the rotor 4, which means that the gearbox 11 has to be designed to handle this massive load on the input side of the gearbox 11, whereas the load on the output side of the gearbox would be significantly smaller. Epicyclic gearboxes 11 used in different wind turbines 1 or gearboxes 11 used in other applications could therefore be designed differently to meet different needs.

In this embodiment of the invention the planet carrier 15 is formed as a simple plate connecting the three planet gears 12, but in another embodiment the planet carrier 15 could comprise a bearing for guiding and stabilizing the carrier 15. This would e.g. be the case if the carrier 15 was connected to a wind turbine rotor 4, and the planet carrier 15 also had to transfer the entire load of the rotor 4. The inner ring of a large diameter bearing could then e.g. be mounted on the outside of the annulus gear 4 and the outer ring of the bearing could be connected to the planet carrier 15, which then would extend beyond the annulus gear 14, or a more or less circular planet carrier 15 could be provided with a bearing around its outer perimeter, where the outer ring of the bearing was connected to the annulus gear 14, the gearbox housing 20 or in other ways fixed.

Figure 5:
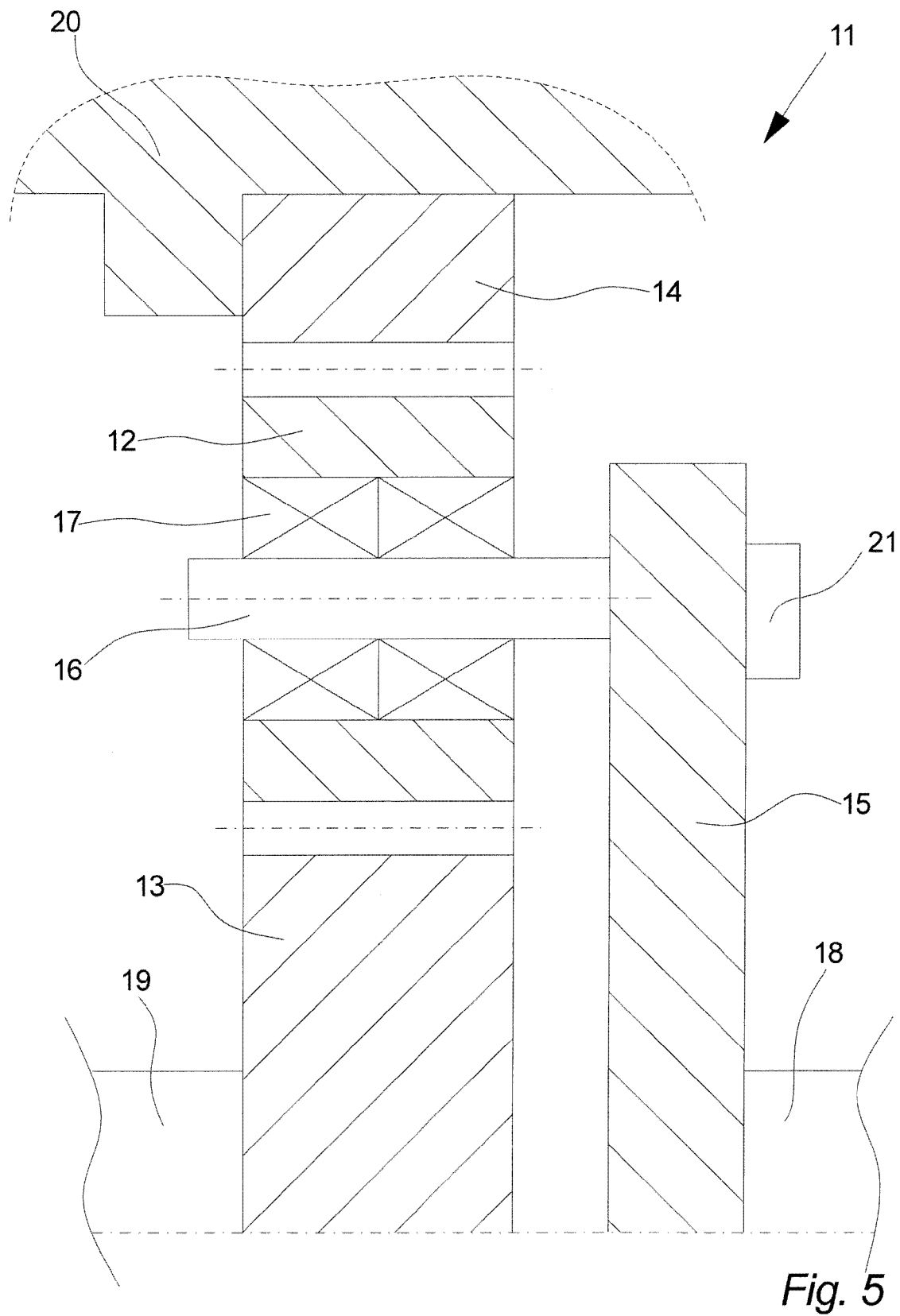
FIG. 5 illustrates a part of a cross section of an embodiment of an epicyclic gearbox, as seen from the side.

FIG. 5 illustrates a part of a cross section of an embodiment of an epicyclic gearbox 11, as seen from the side. In this embodiment of a epicyclic gearbox 11 the planet gears 12 are each provided with two juxtaposed bearings 17 but in another embodiment the planet gears 12 could be provided with another number of bearings 17 or the bearings 17 could be placed in the planet carrier 15, where the shaft 16 then would be rigidly connected to the planet gears 12.

The planet carrier 15 is provided with an input shaft 18, which could be the low speed shaft 6 of a wind turbine 1, but in another embodiment the carrier 15 could be directly coupled to the input generating equipment such as the hub of a wind turbine rotor 4.

The planet gears 12 mesh with the annulus gear 14, which in this embodiment is rigidly connected the gearbox housing 20, and with the sun gear 13, which is provided with an output shaft 19 e.g. connected to another gear stage or connected to a wind turbine generator 9.

In this embodiment of the invention the planet carrier 15 is provided with a number of vibration sensors 21, most likely in form of accelerometers, but it could also be microphones measuring the acoustic emissions which the vibrations generates.

In another embodiment of the invention the sensors 21 measuring condition values could also be e.g. strain-gauges, thermometers or other types of sensors 21 providing information of the conditions of the equipment on which they are mounted or any related equipment.

The carrier 15 is in this embodiment provided with one sensor 21 at the end of each planet gear shaft 16, which in this case would provide the carrier with three sensors 21, but in another embodiment of the invention the gearbox 11 could be provided with another number of sensors 21 and the sensors 21 could be placed elsewhere, such as a different location on the carrier 15, directly on the planet gear shafts 16, in the planet gear shafts 16 (e.g. in a hole, in a recess or in another form of cavity in the shafts 16), on the planet gears 12, on the sun gear 13, on the input shaft 18, on the output shaft 19, on the inner ring of the bearings 17, on the outer ring of the bearings 17, on another revolving member of the gearbox 11 or a combination of different locations.

The sensors 21 could measure vibration from the different moving or rotating parts of the gearbox 11 but it is also feasible, that the sensors 21 could pick up defect vibrations originating from other parts of the wind turbine 1, such as bearings outside the gearbox 11, the rotor 4 or the generator 9.

Figure 6:
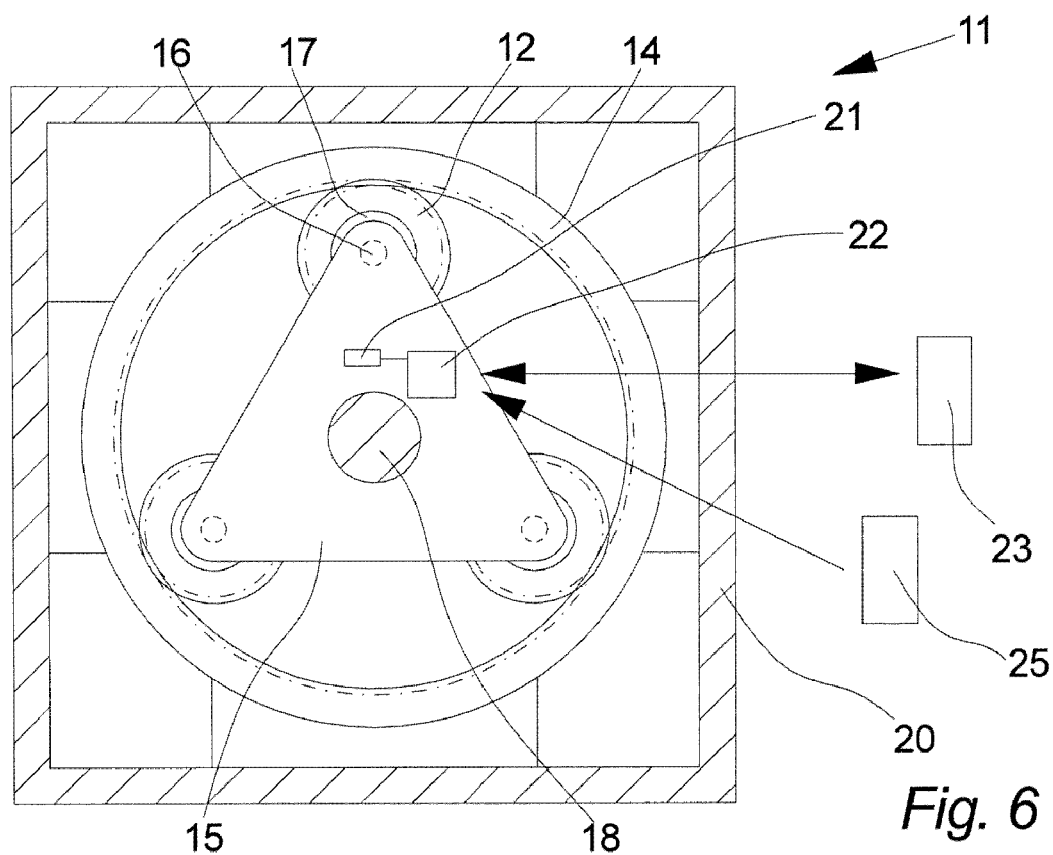
FIG. 6 illustrates an embodiment of a vibration monitoring system for an epicyclic gearbox, as seen from the front.

FIG. 6 illustrates an embodiment of a vibration monitoring system for an epicyclic gearbox 11, as seen from the front.

In this embodiment of the invention a sensor 21 is placed more or less centrally on the planet carrier 15. The sensor 21 is connected to a data transmitter 22, which can transmit the sensor signal wirelessly to an external data receiver 23.

In this embodiment the sensor 21 is connected to a data transmitter 22 through hard wiring but in another embodiment signals and/or electrical power could be transmitted to and/or from the sensors 21 to and/or from the data transmitter 22 wirelessly.

In this embodiment of the invention the data transmitter 22 could communicate with external data receiver 23 wirelessly.

The data transmitter 22 could communicate the unprocessed sensor signal continuously or it could transmit the unprocessed sensor signal in certain time intervals or upon receiving a signal from an externally placed request emitter 25 requesting the sensor signal or signals. The data transmitter 22 could be battery powered or it could function as a transponder, where the external data receiver 23 or another external source emits an electromagnetic impulse large enough for the data transmitter 22 to produce power enough to feed the sensor 21 and transmit the sensor signal back to the external data receiver 23. A transponder solution would render an internal power supply in the data transmitter 22 unnecessary.

In another embodiment of the invention the data transmitter 22 or the sensor 21 or sensors 21 could be connected to the external data receiver 23 directly by means of cables e.g. acting as data conductors and/or supplying the data transmitter 22 or sensors 21 with power.

This hard wiring would have to pass at least one rotating joint between a rotating shaft and the external data receiver 23 placed stationary e.g. in the nacelle 3. The transmitting of signals, electrical power or other though this rotating joint could e.g. be done by means of a slip ring, a brush connection, a collector or other means for transferring power and/or signals to and from a rotating shaft.

Figure 7:
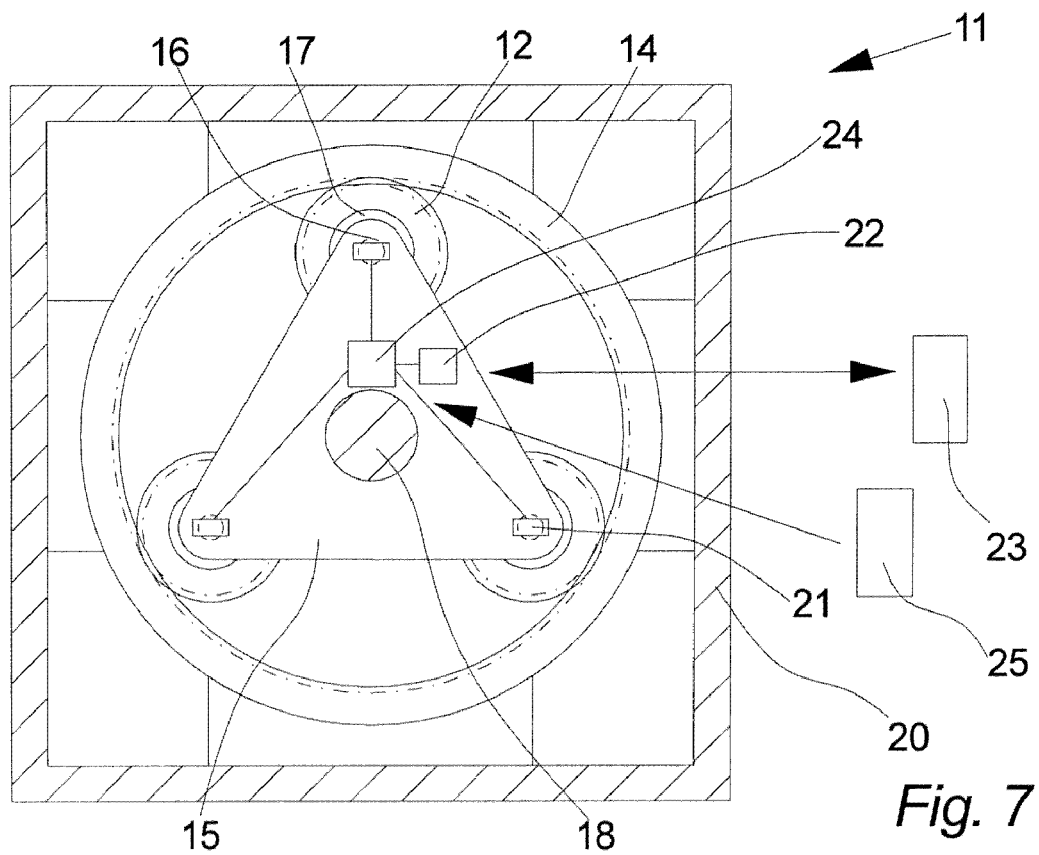
FIG. 7 illustrates another embodiment of a vibration monitoring system for an epicyclic gearbox, as seen from the front.

FIG. 7 illustrates another embodiment of a vibration monitoring system for an epicyclic gearbox 11, as seen from the front.

In this embodiment of the invention the planet carrier 15 is provided with three sensors 21 placed on or in close proximity of the planet gear shafts 16. The three sensors 21 are connected to the same data processing unit 24. The data processing unit 24 could act as a filter removing noise or undesired short-term fluctuations from the sensor signals or it could compress the sensor signals before they are transmitted to the external data receiver 23. The data processing unit 24 could also analyze the sensor signals and then transmit an alarm signal to the external data receiver 23 if it detects abnormalities e.g. in form of defect frequencies.

The data processing unit 24 could transmit the filtered or compressed sensor signal or the conclusion of a data analysis continuously, in certain time intervals or upon receiving a signal from an externally placed request emitter 25.

In this embodiment of the invention the sensors 21, the data processing unit 24 and the data transmitter 22 are shown as separate individual components connected by conductors but in another embodiment the different components 21, 22, 24 could be integrated in one unit or e.g. the data processing unit 24 and the data transmitter 22 could be integrated in one unit.

The invention has been exemplified above with reference to specific examples of vibration sensors 21 mounted on the rotating parts of gearboxes 7, 11. However, it should be understood that the invention is not limited to the particular examples described above but may be designed and altered in a multitude of varieties within the scope of the invention as specified in the claims.

LIST

1. Wind turbine
2. Tower
3. Nacelle
4. Rotor
5. Blade
6. Low speed shaft
7. Gearbox
8. Teeter mechanism
9. Generator
10. High speed shaft
11. Epicyclic gearbox
12. Planet gear
13. Sun gear
14. Annulus gear
15. Planet carrier
16. Planet gear shaft
17. Planet gear bearing
18. Input shaft
19. Output shaft
20. Gearbox housing
21. Sensor
22. Data transmitter
23. External data receiver
24. Data processing unit
25. Request emitter

What is claimed is:

1. A wind turbine comprising at least one epicyclic gearbox, said epicyclic gearbox comprising:
    at least two planet gears each including a planet gear shaft;
    at least one planet carrier connecting said planet gears; and
    one or more sensors configured to measure vibrations and/or acoustic emission of the wind turbine, said one or more sensors mounted on one or more rotating parts of said epicyclic gearbox comprising said at least one planet carrier or said at least two planet gears,
    wherein said at least one planet carrier comprises only one sensor.

2. The wind turbine according to claim 1, wherein said one or more sensors are one or more accelerometers and/or one or more microphones.

3. The wind turbine according to claim 1, wherein said one or more sensors are connected to one or more data transmitters for transmitting data to an external data receiver.

4. The wind turbine according to claim 3, wherein said connection is made wirelessly.

5. The wind turbine according to claim 3, wherein said one or more data transmitters are mounted on said one or more rotating parts of said gearbox.

6. The wind turbine according to claim 3, wherein more than one of said one or more sensors are connected to the same data transmitter.

7. The wind turbine according to claim 3, wherein said one or more data transmitters comprise means for transmitting data continuously during operation of said gearbox.

8. The wind turbine according to claim 3, wherein said one or more data transmitters comprise means for transmitting data upon receiving a request from an externally positioned request emitter.

9. The wind turbine according to claim 3, wherein said one or more data transmitters are hard wired to said external data receiver.

10. The wind turbine according to claim 3, wherein said one or more data transmitters comprise means for transmitting said sensors measurements wirelessly.

11. The wind turbine according to claim 3, wherein said one or more data transmitters comprise a transponder.

12. The wind turbine according to claim 3, wherein said one or more data transmitters and said one or more sensors are formed integrally as one unit.

13. The wind turbine according to claim 1, wherein said one or more sensors are connected to one or more data processing units.

14. The wind turbine according to claim 13, wherein said one or more data processing units are mounted on said one or more rotating parts of said gearbox.

15. The wind turbine according to claim 13, wherein more than one of said one or more sensors are connected to the same data processing unit.

16. The wind turbine according to claim 13, wherein said one or more data processing units comprise means for detecting defects in said gearbox based on the measurements of said one or more sensors.

17. The wind turbine according to claim 16, wherein said one or more data processing units comprise means for generating an alarm signal when detecting a defect in said gearbox.

18. The wind turbine according to claim 13, wherein said one or more data processing units comprise means for filtering said one or more sensors measurements.

19. The wind turbine according to claim 13, wherein said one or more data processing units comprise means for compressing the data of said one or more sensors measurements.

20. The wind turbine according to claim 13, wherein said one or more data processing units and said one or more data transmitters are formed integrally as one unit.

21. The wind turbine according to claim 13, wherein said one or more data processing units and said one or more sensors are formed integrally as one unit.

22. An epicyclic gearbox comprising
a gearbox housing,
one or more gearbox parts configured to rotate in relation to said housing, said one or more gearbox parts comprising at least two planet gears each including a planet gear shaft and at least one planet carrier connecting said planet gears, and
one or more sensors configured to measure vibrations and/or acoustic emission of said gearbox, said one or more sensors mounted on said at least one planet carrier or said at least two planet gears, and said at least one planet carrier comprises only one sensor.

23. The epicyclic gearbox according to claim 22, wherein said one or more sensors are one or more accelerometers and/or one or more microphones.

24. The epicyclic gearbox according to claim 22, wherein said one or more sensors are connected to one or more data transmitters for transmitting data to an external data receiver.

25. The epicyclic gearbox according to claim 24, wherein said connection is made wirelessly.

26. The epicyclic gearbox according to claim 24, wherein said one or more data transmitters are mounted on said one or more rotating parts of said epicyclic gearbox.

27. The epicyclic gearbox according to claim 24, wherein more than one of said one or more sensors are connected to the same data transmitter.

28. The epicyclic gearbox according to claim 24, wherein said one or more data transmitters comprise means for transmitting data continuously during operation of said epicyclic gearbox.

29. The epicyclic gearbox according to claim 24, wherein said one or more data transmitters comprise means for transmitting data upon receiving a request from an externally positioned request emitter.

30. The epicyclic gearbox according to claim 24, wherein said one or more data transmitters are hard wired to said external data receiver.

31. The epicyclic gearbox according to claim 24, wherein said one or more data transmitters comprise means for transmitting said sensors measurements wirelessly.

32. The epicyclic gearbox according to claim 24, wherein said one or more data transmitters comprise a transponder.

33. The epicyclic gearbox according to claim 24, wherein said one or more data transmitters and said one or more sensors are formed integrally as one unit.

34. The epicyclic gearbox according to claim 22, wherein said one or more sensors are connected to one or more data processing units.

35. The epicyclic gearbox according to claim 34, wherein said one or more data processing units are mounted on said one or more rotating parts of said gearbox.

36. The epicyclic gearbox according to claim 34, wherein more than one of said one or more sensors are connected to the same data processing unit.

37. The epicyclic gearbox according to claim 34, wherein said one or more data processing units comprise means for detecting defects in said epicyclic gearbox based on the measurements of said one or more sensors.

38. The epicyclic gearbox according to claim 37, wherein said one or more data processing units comprise means for generating an alarm signal when detecting a defect in said epicyclic gearbox.

39. The epicyclic gearbox according to claim 34, wherein said one or more data processing units comprise means for filtering said one or more sensors measurements.

40. The epicyclic gearbox according to claim 34, wherein said one or more data processing units comprise means for compressing the data of said one or more sensors measurements.

41. The epicyclic gearbox according to claim 34, wherein said one or more data processing units and said one or more data transmitters are formed integrally as one unit.

42. The epicyclic gearbox according to claim 34, wherein said one or more data processing units and said one or more sensors are formed integrally as one unit.

43. An epicyclic gearbox for a wind turbine, the epicyclic gearbox comprising:
an annulus gear having a fixed position;
a sun gear;
a planet carrier including a plurality of gear shafts;
a plurality of planet gears coupling the sun gear with the annulus gear, each of the planet gears mounted on one of the gear shafts of the planet carrier, and each of the planet gears configured to rotate relative to the respective gear shaft and relative to the planet carrier; and a sensor configured to measure vibrations or acoustic emission from at least one of the planet gears, the sensor mounted on one of the gear shafts, in one of the gear shafts, or on the planet carrier.

44. The epicyclic gearbox according to claim 43, wherein the sensor is mounted on one of the gear shafts.

45. The epicyclic gearbox according to claim 43, wherein the sensor is mounted in one of the gear shafts.

46. The epicyclic gearbox according to claim 43, wherein the sensor is mounted on the planet carrier.

47. The epicyclic gearbox according to claim 43, wherein the planet carrier is configured to rotate such that the gear shafts revolve about the sun gear.

* * * * *

UNITED STATES PATENT AND TRADEMARK OFFICE
CERTIFICATE OF CORRECTION

PATENT NO. : 8,393,993 B2  
APPLICATION NO. : 12/179061  
DATED : March 12, 2013  
INVENTOR(S) : Demtroder It is certified that error appears in the above-identified patent and that said Letters Patent is hereby corrected as shown below:

On the title page, at Item (12) and (75) the last name of inventor "~~Demtroeder~~" should read --Demtroder--.

On the title page, item (73), in the Assignee section, change "Wing" to --Wind--.

Signed and Sealed this  
Second Day of July, 2013

Teresa Stanek Rea  
*Acting Director of the United States Patent and Trademark Office*